US011828595B2

(12) United States Patent
Costello

(10) Patent No.: US 11,828,595 B2
(45) Date of Patent: Nov. 28, 2023

(54) INSTRUMENT FOR DETERMINING LEVEL OR PLUMB ORIENTATIONS

(71) Applicant: Thomas Costello, Covina, CA (US)

(72) Inventor: Thomas Costello, Covina, CA (US)

( * ) Notice: Subject to any disclaimer, the term of this patent is extended or adjusted under 35 U.S.C. 154(b) by 0 days.

(21) Appl. No.: 17/548,535

(22) Filed: Dec. 12, 2021

(65) Prior Publication Data

US 2023/0184549 A1 Jun. 15, 2023

(51) Int. Cl.
*G01C 9/36* (2006.01)
*G01C 9/34* (2006.01)

(52) U.S. Cl.
CPC ........ *G01C 9/36* (2013.01); *G01C 9/34* (2013.01)

(58) Field of Classification Search
CPC .................................. G01C 9/36; G01C 9/34
USPC .......................................................... 33/381
See application file for complete search history.

(56) References Cited

U.S. PATENT DOCUMENTS

| 1,422,231 | A | * | 7/1922 | Stanley | G01C 9/34 |
| | | | | | 33/390 |
| 1,593,961 | A | * | 7/1926 | Wood | G01C 9/36 |
| | | | | | 33/390 |
| 2,695,949 | A | * | 11/1954 | Ashwill | G01C 9/32 |
| | | | | | 33/DIG. 1 |
| 4,011,660 | A | * | 3/1977 | Johnson | G01C 9/28 |
| | | | | | 33/379 |
| 4,419,833 | A | * | 12/1983 | Wright | G01C 9/32 |
| | | | | | 33/379 |
| 4,492,038 | A | * | 1/1985 | Mayes | G01C 9/34 |
| | | | | | 33/379 |
| D280,185 | S | * | 8/1985 | Wright | G01C 9/24 |
| | | | | | D10/69 |
| 4,979,310 | A | * | 12/1990 | Wright | G01C 9/24 |
| | | | | | 33/379 |
| 7,024,781 | B1 | * | 4/2006 | Cowie | G01C 9/32 |
| | | | | | 33/348 |
| 7,086,166 | B2 | * | 8/2006 | Helda | G01C 9/26 |
| | | | | | 33/375 |
| 7,363,719 | B2 | * | 4/2008 | Levinson | G01C 9/28 |
| | | | | | 33/384 |
| 7,975,393 | B2 | * | 7/2011 | Sparrow | G01C 9/32 |
| | | | | | 33/379 |
| 9,068,827 | B2 | * | 6/2015 | Webb | G01C 9/28 |
| 9,995,580 | B2 | * | 6/2018 | Huang | G01C 9/34 |
| 11,092,439 | B2 | * | 8/2021 | Woryk | G01B 3/06 |

(Continued)

*Primary Examiner* — George B Bennett
(74) *Attorney, Agent, or Firm* — Morgan Law Offices, PLC

(57) ABSTRACT

An instrument for determining level or plumb orientations includes an elongated body having a plurality of orientation measurement devices. Each of the orientation measurement devices can indicate either a level or plumb orientation depending on a position of the instrument. The orientation measurement devices each include a chamber having front and rear convex sides, a fluid contained in the chamber, and an air bubble floating in the fluid. The elongated body includes a set of first openings and a set of second openings. The orientation measurement devices are embedded into the elongated body through the first set of openings and the orientation measurement devices each include bubble therein viewable from the front and back of the elongated body. The bubble is also viewable from the top and bottom of the elongated body through the second set of openings.

12 Claims, 5 Drawing Sheets

(56) References Cited

U.S. PATENT DOCUMENTS

| | | | |
|---|---|---|---|
| 11,181,366 B2* | 11/2021 | Sanders | G01C 9/28 |
| 2015/0113819 A1* | 4/2015 | Silberberg | G01C 9/24 |
| | | | 33/381 |
| 2018/0120104 A1* | 5/2018 | Liao | G01C 9/28 |
| 2022/0341734 A1* | 10/2022 | Brown | G01C 9/32 |

* cited by examiner

INSTRUMENT FOR DETERMINING LEVEL OR PLUMB ORIENTATIONS

TECHNICAL FIELD

The present disclosure relates to an instrument for determining level or plumb orientations using orientation measurement devices that can measure either orientation.

BACKGROUND

A level (sometimes referred to as a bubble level or a spirit level) is an instrument that is used to determine whether a surface (or marked line) is level. Conventional levels typically include an elongated body (a "stick") having disposed therein horizontal, sealed cylindrical vials partially filled with alcohol or another liquid, each containing an air bubble. When the level is placed on a level surface, the air bubbles will be disposed in the middle of the horizontal vials. In most cases, a pair of indicator lines is provided such that when the air bubbles are seen between the pairs of lines, it is determined that the measured surface (or marked line) is level.

In addition to determining level, many level sticks embed another set of vertically placed vials which have the same or similar structures as the horizontal vials mentioned above. These vertically placed vials are used to measure whether a surface is plumb, that is, perpendicular. When the level stick is placed vertically against a surface (or a plumb line), the air bubble will be disposed in the middle of these vials if the surface (or plumb line) is perpendicular. Again, pairs of indicator lines are usually provided.

Levels are well-known and have existed in various forms for a long time. A conventional level having an aluminum body with separate level and plumb vials is disclosed in U.S. Pat. No. 1,128,361 to Rasey, issued in 1915. Although conventional levels are often useful, they are not without problems. For example, conventional levels utilize separate vials that are each dedicated to determining level or plumb. That is, the same vial cannot be used to determine both level and plumb. As a result, most level sticks incorporate three vials, two of which are placed horizontally, and the remaining vial is placed vertically. This arrangement can make it more difficult to use, particularly in the case of measuring plumb since there is only one available vial that measures plumb. Moreover, there can be greater manufacturing expense to include additional vials for users who might want to measure either level or plumb using the same measurement device.

SUMMARY

An instrument for determining level or plumb orientations includes an elongated body having a plurality of orientation measurement devices. Advantageously, each of the orientation measurement devices can indicate either a level or plumb orientation depending on a position of the instrument. The orientation measurement devices each include a chamber having front and rear convex sides, a fluid contained in the chamber, and an air bubble floating in the fluid. The elongated body includes a set of first openings and a set of second openings. The orientation measurement devices are embedded into the elongated body through the first set of openings and the orientation measurement devices each include the bubble therein viewable from the front and back of the elongated body. The bubble is also viewable from the top and bottom of the elongated body through the second set of openings.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1A:
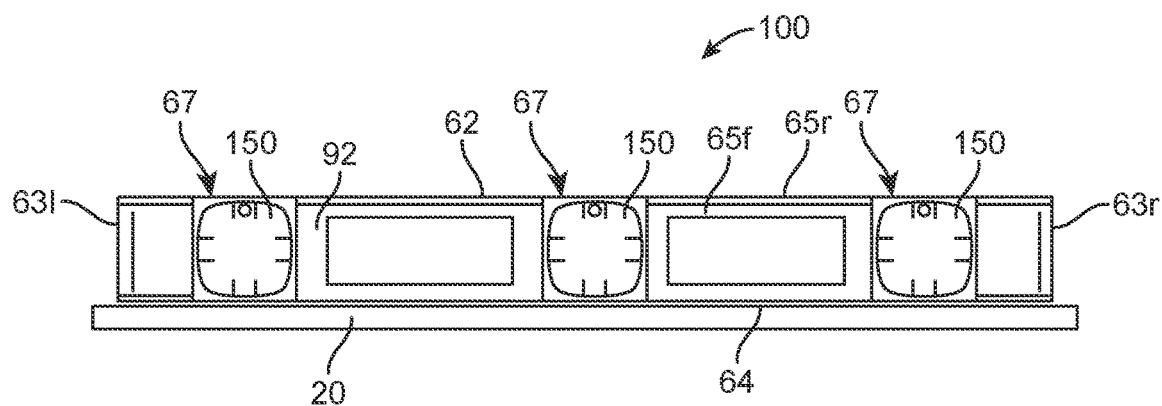
FIG. 1A shows a front view of an example instrument for determining level or plumb orientations placed upright on a horizontal surface to determine whether the surface is level, according to an embodiment.
Figure 1B:
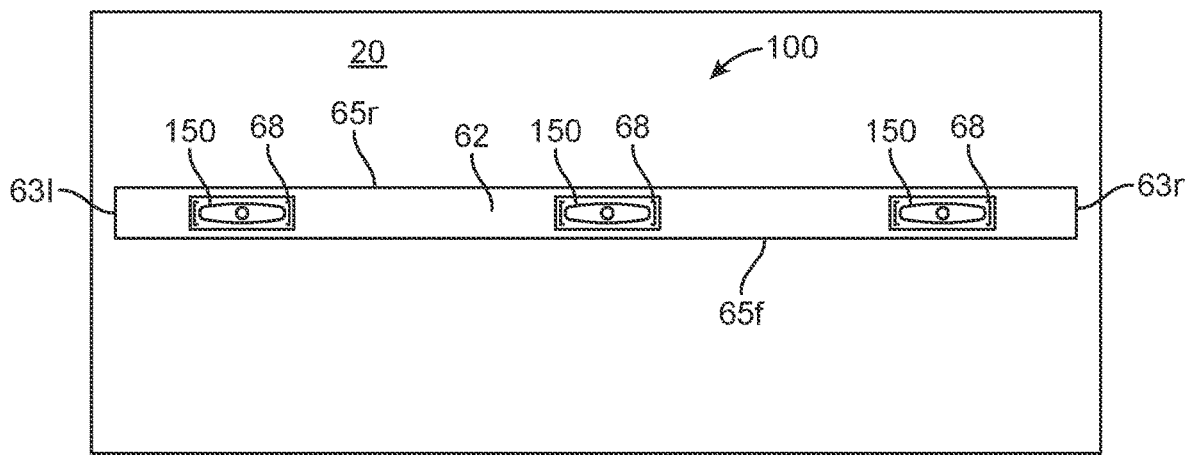
FIG. 1B shows a top view of the example instrument for determining level or plumb orientations shown in FIG. 1A.

Referring to FIG. 1A, a front view of an example instrument for determining level or plumb orientations 100, according to an embodiment of the disclosure, is illustrated. The instrument for determining level or plumb orientations 100 is shown placed upright on a horizontal surface 20 to determine whether the surface 20 is level. FIG. 1B is a top view thereof.

The instrument for determining level or plumb orientations 100 includes an elongated body 92, a flat top surface 62, a flat bottom surface 64, a pair of left/right sides 63l/ 63r, a pair of front/rear sides 65f/ 65r and a plurality of orientation measurement devices 150 embedded into the elongated body 92 through first openings 67, situated along and each extending entirely through the front/rear sides 65f/ 65r. The top surface 62 and the bottom surface 64 include respective second openings 68 for viewing the lateral sides of the orientation measurement devices 150 from above or below. It is to be understood that the rear side 65r of the instrument for determining level or plumb orientations 100, which is not shown, is a mirror image of the front side 65f. Furthermore, the bottom surface 64 of the instrument for determining level or plumb orientations 100, which is not shown, is a mirror image of the top surface 62. When placed as shown on the horizontal surface 20, the orientation measurement devices 150 can be seen from the front or back sides 65, and as illustrated in FIG. 1B, also from the top. If the horizontal surface 20 is opaque, the horizontal surface 20 would block the view of the bottom surface 64; otherwise, it is to be understood that the bottom surface 64 would be viewable.

The elongated body 92 can be made of a suitable durable material, preferably extruded aluminum, stainless steel, or a rigid plastic such as ABS (acrylonitrile butadiene styrene). As shown, the instrument for determining level or plumb orientations 100 includes three substantially identical orientation measurement devices 150. It is to be appreciated that the number of orientation measurement devices 150 devices used may be fewer or greater than the illustrated example. Additionally, the placement of the orientation measurement devices 150 may differ from the illustrated embodiment. Furthermore, it is to be understood that the instrument for determining level or plumb orientations 100 can be made in various sizes. For example, in an embodiment, the instrument for determining level or plumb orientations 100 has a length of about four feet, a height of about three inches, and a thickness of about 1.25 inches. In that embodiment, the orientation measurement devices 150 have both a height and width of about two inches each, and a thickness of about 0.5 inches. In other embodiments, the body 92 can be either a smaller or larger size (e.g., 18 inches, 6 feet) depending on usage requirements.

Figure 2A:
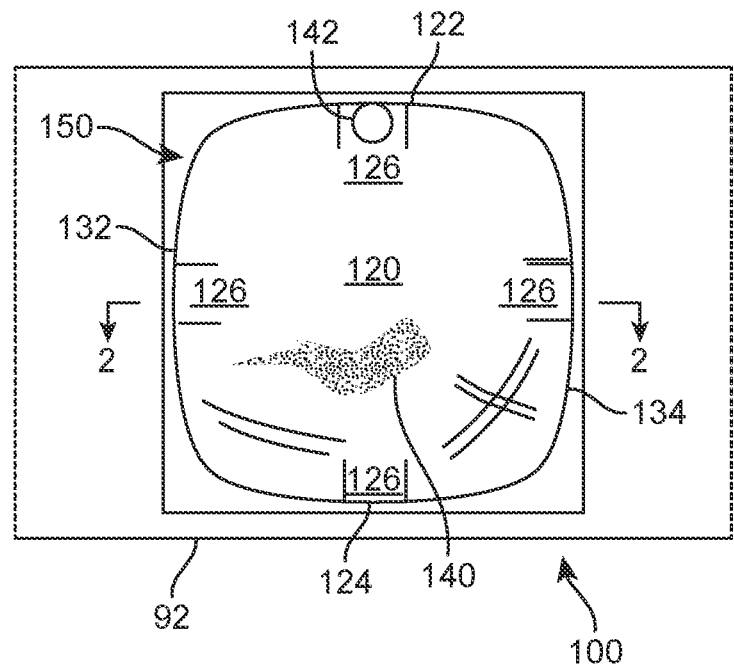
FIG. 2A shows a front view of an example orientation measurement device useable with the instrument for determining level or plumb orientations, according to a first embodiment of the disclosure.
Figure 2B:
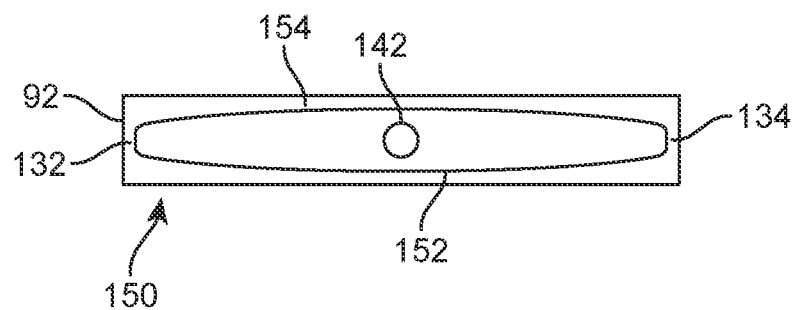
FIG. 2B shows a cross-sectional view of the example orientation measurement device along line 2-2 of FIG. 2A.

Referring to FIG. 2A, an example orientation measurement device 150 is illustrated in greater detail, according to a first embodiment. The orientation measurement device 150 comprises four transparent lateral sides 122, 124, 132, and 134, including: first and second horizontal sides 122 and 124, which are opposedly positioned; and first and second vertical sides 132 and 134, which are opposedly positioned. With reference to FIG. 2A, the orientation measurement device 150 further comprises a front convex side 152, which is transparent and watch-crystal-shaped, with a central outermost extending point; and a rear convex side 154, which is transparent and watch-crystal-shaped, with a central outermost extending point, such that the top and bottom convex sides are opposedly positioned; wherein the first and second horizontal sides 122 and 124, the first and second vertical sides 132 and 134, and the front and rear convex sides 152 and 154 are connected to form a convex shell/enclosure which defines/encloses a measuring chamber 120; a measuring fluid 140 such as water or alcohol, which is disposed in the measuring chamber 120, and a fluid measuring bubble 142, which is disposed in the measuring fluid 140 inside the measuring chamber 120. Indicator lines 126 can be printed or otherwise marked along the peripheries of the front and rear convex sides 152, 154, each set adjacent and at the approximate center of a respective side 122, 124, 132, 134, of each of the front and rear convex sides 152 154.

Figure 1C:
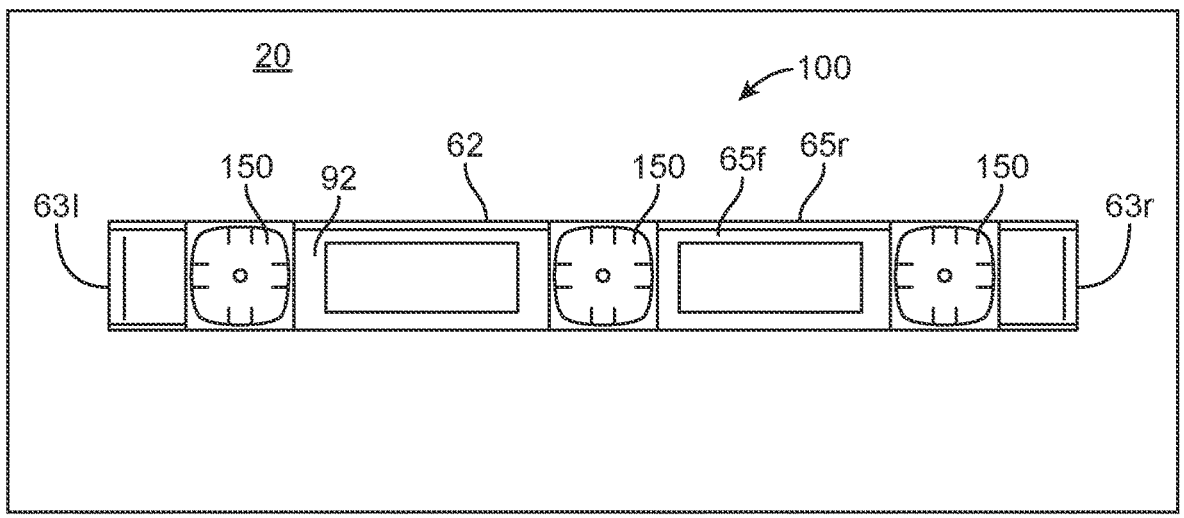
FIG. 1C shows a top view of the example instrument for determining level or plumb orientations of FIG. 1A placed so that the front is facing upward, on the horizontal surface to determine whether the surface is level.
Figure 1D:
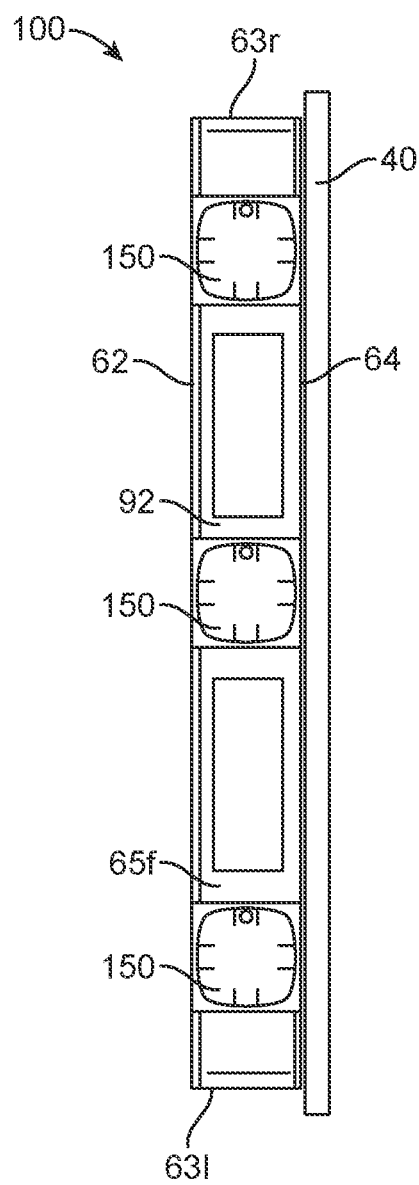
FIG. 1D shows a front view of the example instrument for determining level or plumb orientations placed against a vertical surface to determine whether the surface is plumb.
Figure 1E:
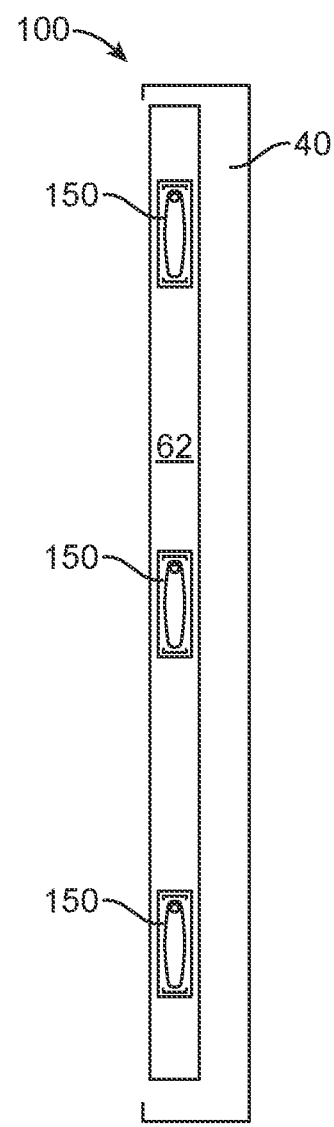
FIG. 1E shows a top view of the example instrument for determining level or plumb orientations as positioned in FIG. 1D.
Figure 3:
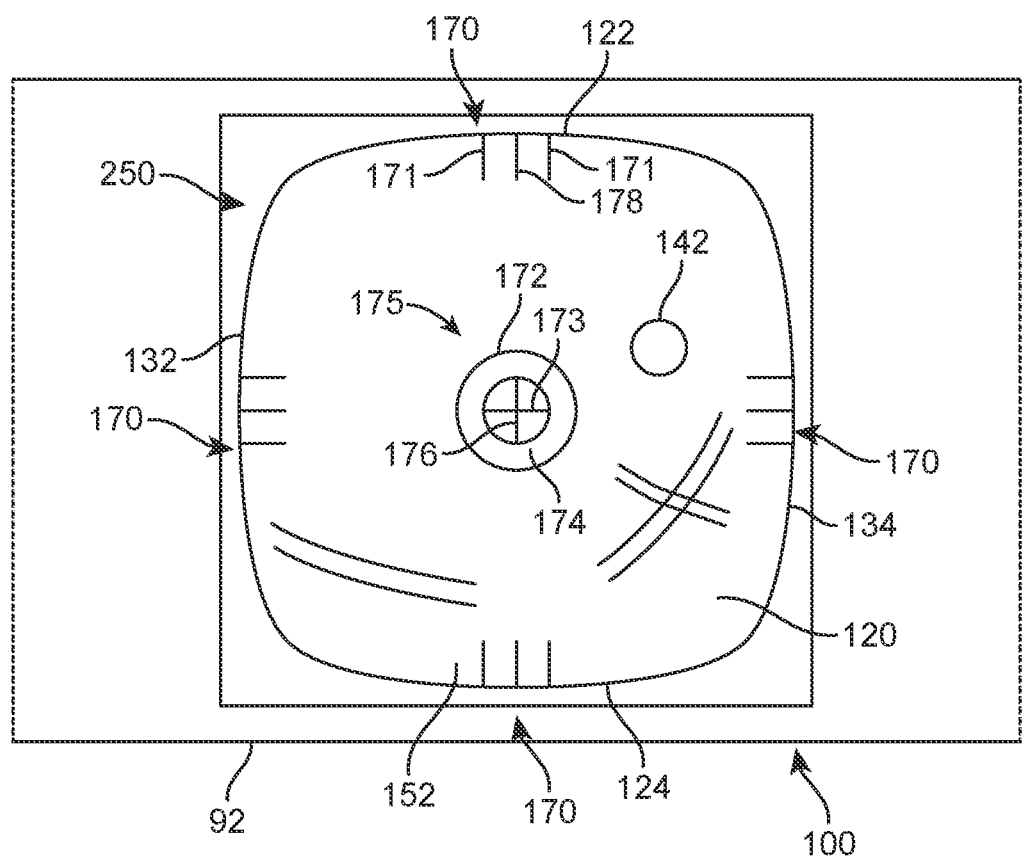
FIG. 3 shows a front view of an example orientation measurement device useable, according to another embodiment of the disclosure.

FIG. 3 shows a front view of an example orientation measurement device 250, according to another embodiment of the disclosure. The orientation measurement device 250 can be substituted for the orientation measurement device 150 in the instrument for determining level or plumb orientations 100. The orientation measurement device 250 is similar to the orientation measurement device 150, the differences being that the orientation measurement device 250 includes indicator lines 170 instead of the indicator lines 126, and a bullseye target 175, on the front convex side 152 and identically on the rear convex side 154. The indicator lines 170 can be printed or otherwise marked along the peripheries of the front and rear convex sides 152, 154, each set adjacent and at the approximate center of a respective side 122, 124, 132, 134, of each of the front and rear convex sides 152 154. Each of the indicator lines 170 includes a set of parallel lines 172 and a center parallel line 178 situated equidistant with respect to each of the parallel lines 172, as shown. These indicator lines 170 are similar in placement and usage to the indicator lines 126 discussed above, except for the additional center parallel line 178. The bullseye targets 175 can be imprinted or otherwise marked on each of the front and rear convex sides 152 154. As shown, the bullseye target 175 includes an inner target circle 174, a center target crosshatch including perpendicular intersecting vertical and horizontal lines 176 173, such that the vertical and horizontal lines 176 173 extend between opposing points of the inner target circle 174, such that an intersection point of the vertical and horizontal lines 176 173 is in the center of the inner target circle 174; and an outer target circle 172, which is symmetrically positioned around the inner target circle 174, such that inner target circle 174 and the outer target circle 172 are coaxial. It is to be understood that the illustrated bullseye target 175 is shown having a particular non-limiting pattern and that other bullseye designs and the like may be used instead of the one shown. The bullseye target 175 can be used, for example, to indicate that the air bubble 142 is at the approximate center of the rear and front convex sides 152 154, to show a level orientation, such as when the instrument for determining level or plumb orientations 100 is positioned as in FIG. 1C.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An instrument for determining level or plumb orientations, comprising:
   an elongated body including a plurality of orientation measurement devices, each of the orientation measurement devices including:
      a chamber having a first convex side and a second convex side, opposedly positioned, and a lateral side disposed between the first convex side and the second convex side;
      a fluid contained in the chamber; and
      a bubble within the fluid;
   wherein the elongated body includes a set of first openings and a set of second openings;

wherein the orientation measurement devices are embedded into the elongated body and disposed in the set of first openings; and wherein the orientation measurement devices each include the bubble therein viewable, depending on the position of the viewer, from the front through the first convex side, the back through the second convex side, and the top through one of the set of second openings and the lateral side.

2. The instrument for determining level or plumb orientations of claim 1, wherein, when the elongated body is placed horizontally on a substantially level surface, the bubble will travel to the approximate highest central point of the chamber relative to the ground.

3. The instrument for determining level or plumb orientations of claim 1, wherein, when the elongated body is placed vertically on a substantially plumb surface, the bubble will travel to the approximate highest central point of the chamber relative to the ground.

4. The instrument for determining level or plumb orientations of claim 3, wherein the highest central point reached when the elongated body is placed horizontally on a substantially level surface is different from the highest central point of the chamber when the elongated body is placed vertically on a substantially plumb surface.

5. The instrument for determining level or plumb orientations of claim 4, wherein the highest central point reached when the elongated body is placed horizontally on a substantially level surface is positioned at about a 90 degree arc from the highest central point of the chamber when the elongated body is placed vertically on a substantially plumb surface.

6. The instrument for determining level or plumb orientations of claim 1, wherein, when the elongated body is placed in its side with a front or rear of the elongated body facing upwards on a substantially level surface, the bubble will travel to the approximate middle point of the chamber.

7. The instrument for determining level or plumb orientations of claim 1, wherein the chamber includes a plurality of indictor lines.

8. The instrument for determining level or plumb orientations of claim 7, wherein the indicator lines each include a pair of parallel lines adjacent peripheries of each of the front and rear sides of the chamber.

9. The instrument for determining level or plumb orientations of claim 7, wherein the indictor lines each include three parallel lines adjacent peripheries of each of the front and rear sides of the chamber.

10. The instrument for determining level or plumb orientations of claim 1, wherein the chamber includes a central indicator on each of the front and rear sides of the chamber.

11. The instrument for determining level or plumb orientations of claim 10, wherein the central indicator on each of the front and rear sides of the chamber are represented as a bullseye.

12. The instrument for determining level or plumb orientations of claim 1, wherein the elongated body includes at least three of the orientation measurement devices.

* * * * *